INVENTORS
Nicholas J. Panzica
Robert G. Millhiser
Warren W. Wooll, Jr

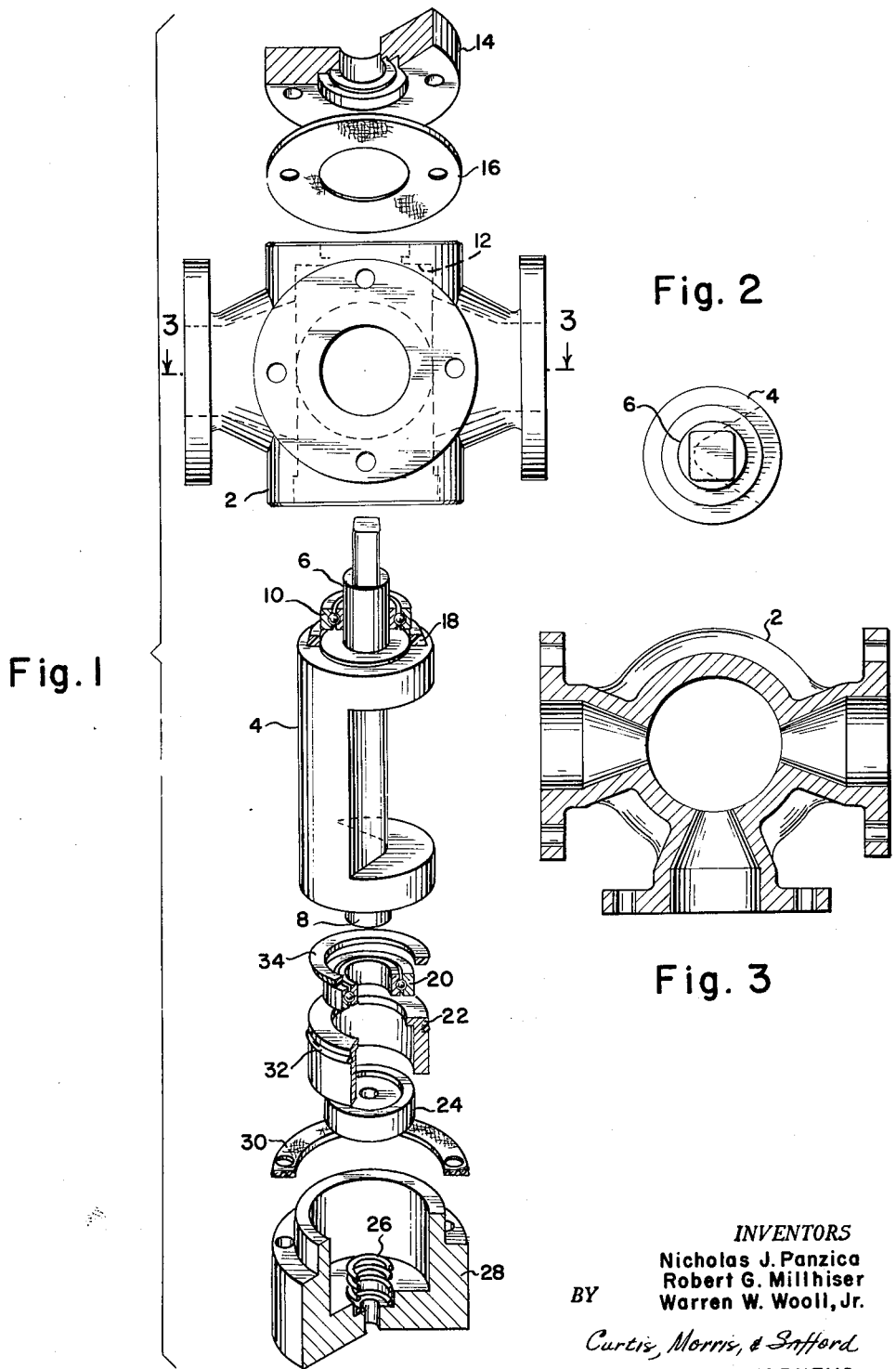

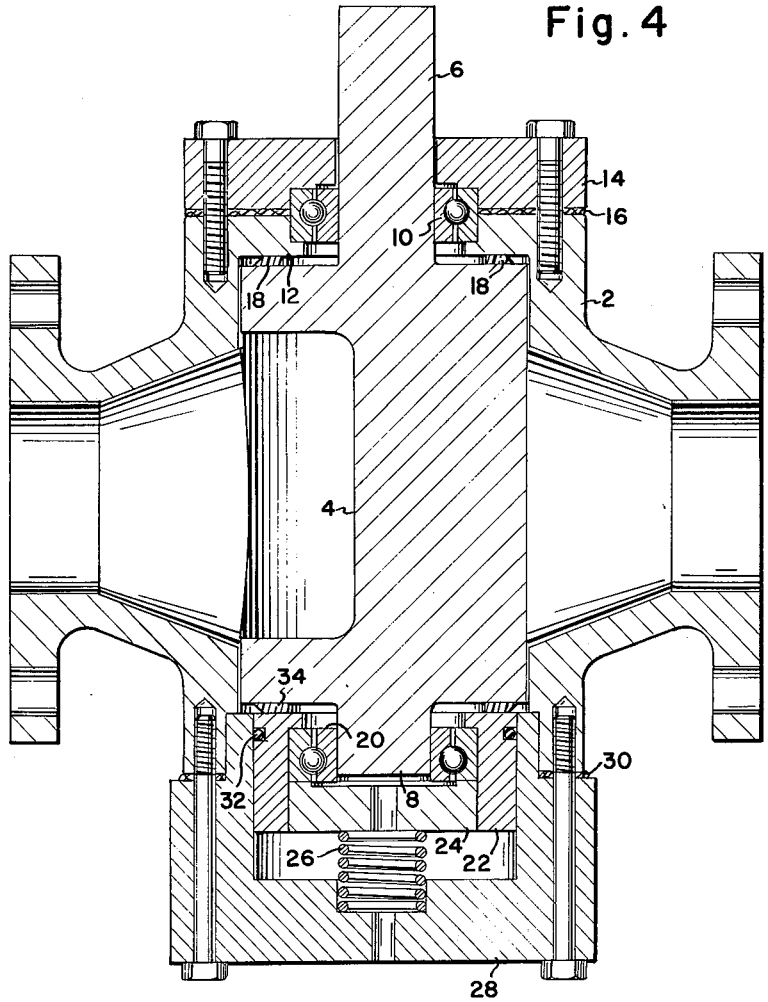

BY

Curtis, Morris, & Safford
ATTORNEYS

United States Patent Office 3,233,865
Patented Feb. 8, 1966

3,233,865
ROTARY PLUG VALVE
Nicholas J. Panzica and Robert G. Millhiser, Detroit, and Warren W. Wooll, Jr., Livonia, Mich., assignors to Ajem Laboratories, Inc., Livonia, Mich.
Filed Nov. 4, 1960, Ser. No. 67,396
9 Claims. (Cl. 251—309)

The present invention relates to a liquid flow-control valve designed for efficient, long use under abusive conditions. This invention is particularly adapted for use in high pressure systems and is well adapted for transport of slurries or abrasive suspensions.

In many liquid systems, both high pressure and low pressure, having suspensions of particulate matter of an abrasive nature, there are serious problems of excessive wear, seizing, or damaging action. Such problems may result from abrasive action of the suspensions on the valve parts and in close clearances and are aggravated by high pressure and/or velocity which hastens wear and causes "water hammer" damage action when the flow is abruptly impeded.

The need for liquid diversion or cut-off valves that operate efficiently under such conditions is important in industrial operations, for example in the treatment and transport of pulverized ores, etc.

This need has also occurred in the field of hydraulic deburring or surface reforming machines which utilize abrasive suspensions directed with high-velocity against parts or other articles whose surface is to be smoothed, scoured, or otherwise reformed. An example of this type machine is described in the copending application of Robert G. Millhiser et al., Serial No. 122,521, filed July 7, 1961 now Patent No. 3,146,550 issued Sept 1, 1964.

Experience with such machines showed that seizing or jamming of the valve should ordinarily be expected after only a few cycles, thus seriously impairing the performance capacity of proper functioning of the machine as a whole. This jamming was caused by finely divided abrasive material packing in the close clearance areas, displacing the plug against the cylindrical wall of the valve housing and causing subsequent high friction and seizing of parts.

The type of valves described herein as embodiments of the present invention are well adapted to operate even under these aforementioned abusive conditions. According to the present invention relatively large clearances can exist between the valve body and the valve plug to allow potentially abrasive or jamming particles to flow freely therethrough. Then a material, such as Teflon, having both good sealing and good bearing characteristics is positioned between the valve plug and the valve body and around a valve plug axle, and thrust means keeps this ring of material tightly seated and functioning as a seal.

In high velocity jet devices, e.g., power washers, it is often necessary to shut off the liquid flow through the jets when the washer is opened, e.g. for entry or removal of articles being washed. If this is done by ordinary shut-off valves, there are likely to be objectionable inertial effects; but according to the present invention the flow is merely diverted, either to more remote outlets or back to the storage reservoir or run-off.

An important advantage of the valve of this invention is long life, even under high pressure and abrasive conditions. This means a capacity for long time operation, freedom from seizure of moving components, protection of bearing surfaces from abrasive action and resistance to wear.

Important economies are effected by the present invention because of its avoidance of sudden changes in the loads on electric motors driving pumping equipment. In many cases this can be accomplished with no increase in current consumption by merely diverting the flow from one operation to another in a cycle where such operations are fitted together, but even where the flow is merely by-passed back to a reservoir the cost of current consumed during that period of by-pass can be more than offset by saving, including particularly a saving in electric power rate where a better, or more stable, power factor can be shown; reduction of deterioration of the motors and equipment by repeated starting and stopping or repeatedly accelerating and de-accelerating; reduction of deterioration on other equipment on the same line due to surges which result from sudden changes in the loading; and even reduction in the size of motors and pumping equipment required to maintain a substantial uniform flow as compared with what would be required to suddenly and repeatedly accelerate the volume of flow.

A further advantage of the ease of maintenance, and longer life because of the simplicity of design and the easy access to the component parts.

Another advantage is the partial opening of one exit port while closing off the other in the diversion valve, as the valve plug is rotated, thus allowing a continuing constant rate of flow if desired, and with a large volume of liquid at high pressures, and thereby avoiding inertial shock to the pump and possibly to other members of the system, which would result if there was an abrupt cutoff during the transfer from one outlet part to another.

Among the further advantages of the valves described herein are easy action and low torque, adaptability to use with either corrosive or non-corrosive chemical systems, and adaptability for construction with available low-friction materials.

Moreover, ability to use a diversion valve as a by-pass system in flushing, washing, rinsing and abrasive blasting machines, or the like, obviates the need to shut down the pump when one operation in a cycle is completed, or otherwise to stop the flow of large volumes of liquid involving high inertial forces with consequent wear, loss of time, and use of special structural precautions otherwise necessary. This by-pass system is necessary in machines and systems which require intermittent operation from a given jet or group of jets.

The various aspects, features and advantages of the present invention will be more fully understood from the following description in conjunction with the accompanying drawings, in which:

FIGURE 1 is an exploded side view of a preferred embodiment of the present invention, partially cut away on some of the components to show internal structure;

FIGURE 2 is a top plan view of the valve plug;

FIGURE 3 is a cross-sectional view of the valve body taken on line 3—3 of FIGURE 1;

FIGURE 4 is a vertical cross-sectional view of the valve, and

Figure 5:
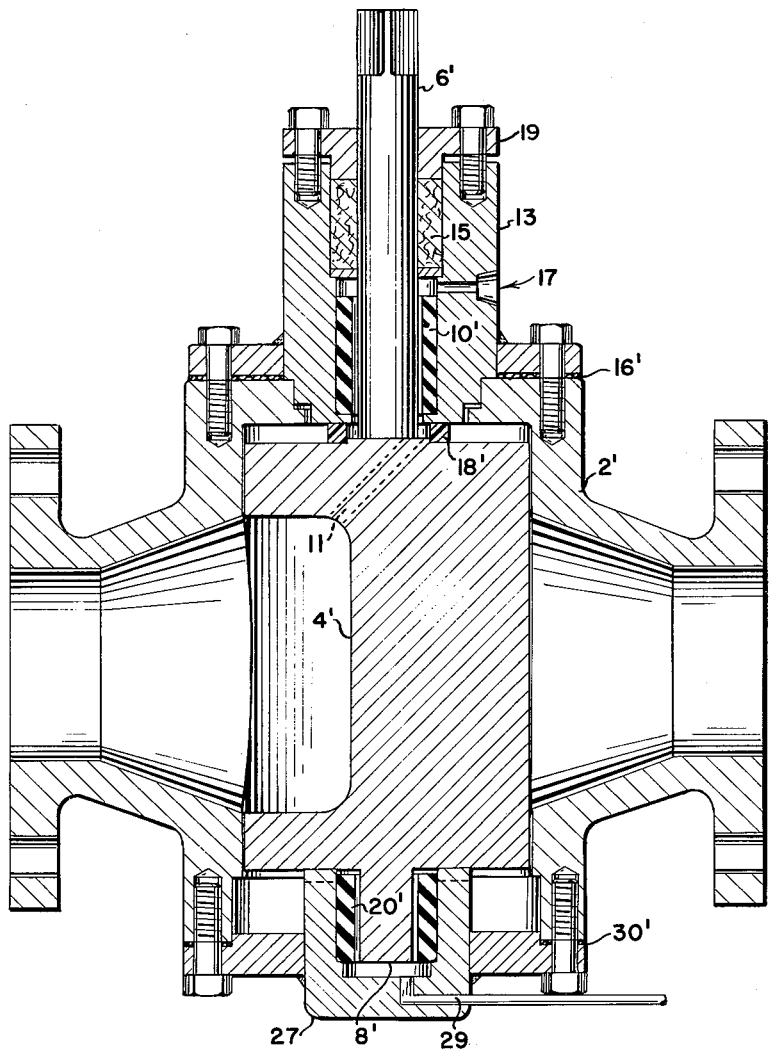
FIGURE 5 is a vertical cross-sectional view of another preferred embodiment of the present invention.

In the valve as shown, the valve body 2 has three access ports. The valve plug 4 fits loosely into the valve chamber of the valve body 2 with clearance adapted to allow free flow of suspended particles with the fluid. Centered on and fixed to the valve plug is the control axle 6 and the short axle 8. Note (especially in FIGS. 1 and 2) that the central portion of the valve plug 4 is partially cut away leaving a solid portion in an arc equal to the sum of one access port and of the adjacent partition between it and the nearest access port. Thus when one turns the valve to shut off one port and open another, the latter port is opened by the same increments as the first is closed, thereby allowing an essentially constant flow rate.

Main bearing 10 sits on support ledge 12 and is held there by bearing cap 14 which fits over a valve body gasket 16 and is secured by screws (not shown on FIG. 1). The main bearing seal 18 seats on top of the cylindrical valve plug 4 and butts against the valve body support ledge 12 thus isolating the main bearing 10 from the liquid in the valve.

Main bearing 20 is carried in a floating bearing support means comprising a piston 22, and is held therein by plug 24 which is held inside piston 22 by spring 26 which in turn is held in position by retainer cap 28. The retainer cap 28 fits onto the bottom of the valve body 2 with a valve body gasket 30 between the two. The floating seal 32 rides in a groove on the outside of piston 22 and together with the main bearing seal 34, which seats on the bottom of the valve plug 4 and is compressed by spring pressure delivered via the piston 22, the two seals isolate the floating main bearing 20 from the liquid in the valve.

FIGURE 5 shows a modified embodiment from that depicted in FIGURES 1–4. Corresponding parts between the two embodiments are indicated in FIGURE 5 by a prime (') after the reference number. The principal difference in this second embodiment is that the main bearings 10' and 20' are not isolated from the liquid suspension in the valve chamber but rather are actually lubricated by said liquid through grooves or other channels to the bearing face. With aqueous liquids, the main bearings 10' are made of a bearing material such as hardened abrasion resistant metals and abrasion resistant plastics, but yield of bearing material should be small in comparison to the clearance between valve plug and body used in accordance with this invention.

Also, compression on a single thrust-bearing and seal 18' is accomplished by a pressure differential on the valve plug 4'. This differential is accomplished by having a greater lower surface exposed to the valve liquid under high pressure than is exposed on the upper surface, for example by the width of the thrust-bearing 18' or by a difference in the diameter of the axles 6' and 8'. (The thrust means of various illustrated embodiments of the present invention may be modified or combined or otherwise adapted to a particular design as would occur to those skilled in the art having access to the present disclosure.) This arrangement does away with the need for a floating bearing; therefore, the retainer cap 28 on the first embodiment becomes instead the lower main bearing support 27 with a weep hole 29, which can be fitted with a pipe (not shown) to carry off the liquid escaping past the main bearing.

A liquid access hole 11 passes through the valve plug 4' to the control axle 6' to allow liquid to reach the upper main bearing 10'. The upper main bearing support 13 also has a weep hole 17 below the packing gland 15. The packing retainer cap 19 fits over the axle 6' and onto the upper main bearing support 13 and compresses packing gland 15.

From the foregoing, it will be apparent that the present invention provides a novel valve for handling liquids which would damage an ordinary valve.

Although I have shown in the drawings and described above two embodiments of my invention and certain alternatives and indicated ranges of variation, it will be understood that these are not exhaustive but are given rather to aid others skilled in the art to adapt and modify the invention so as to be best suited to the conditions and requirements of each particular use.

We claim:

1. A diversion valve for long life comprising a valve body having inlet and outlet ports and a cylindrical valve chamber, a cylindrical valve plug rotatably mounted in said valve chamber with clearances sufficient to maintain free passage of suspended particles and partially cut away leaveing essentially two parallel disks with a segment of a cylinder extending between them, a stub axle at one end of said plug on its axis of rotation and a longer control axle at the opposite end, main bearings for said axles, bearing seals for isolating said main bearings from said valve chamber, long axle bearing-support means mounted at one end of said valve chamber, stub axle floating-bearing-support, means mounted at the other end of said valve chamber, thrust means for positioning said stub axle floating-bearing-support means, and a retainer cap for seating said thrust means in position.

2. A flow-control valve for long life comprising a valve body having inlet and outlet ports and a valve chamber shaped like a body of revolution, a valve plug rotatably mounted in said valve chamber with clearances sufficient to maintain free passage of suspended particles and having a shape generally conforming to that of the valve chamber except where it is partially cut away for flow control, valve plug axles extending longitudinally along the axis of rotation, main bearings for said axles, a main bearing support means mounted on the valve body, a floating main bearing support means, main bearing seals for completely isolating the main bearings from said valve chamber, thrust means positioning and retaining said floating-main-bearing-support means and one of said main bearings carried therein about one said axle, and a support means for the thrust means.

3. A fluid diversion valve comprising a valve body having inlet and outlet ports, a cylindrical valve chamber, and a support ledge extending partially across one end of the valve chamber, a cylindrical valve plug rotatably mounted in said valve chamber with clearances sufficient to maintain free passage of suspended particles and partially cut away for flow control leaving essentially two parallel disks with a segment of a cylinder extending between them, said plug also having a liquid access hole running from the cut away portion to the longer axle for the purpose of lubricating the main bearing, a stub axle at one end of said cylindrical valve plug extending along its longitudinal axis and a longer control axle at the opposite end, a thrust bearing seated on one end of the valve plug around the longer axle, main bearings for said axles, a stub axle main bearing support means with a weep hole, a packing gland, a long axle main bearing support means with a weep hole adapted to also support said packing gland around the control axle to prevent leaking above the peep hole, a packing retainer cap, and said valve plug having a greater surface exposed to hydraulic pressure within said chamber tending to force the plug against said thrust bearing than the surface exposed to opposing pressure, each main bearing and axle being so constructed and mounted as to prevent significant lateral movement of the plug thereby to maintain said clearances at all times.

4. A fluid flow-control valve for long life comprising a valve body having inlet and outlet ports and a valve chamber shaped like a body of revolution, a valve plug rotatably mounted in said valve chamber with clearances sufficient to maintain free passage of suspended particles and having a shape generally conforming to that of the valve chamber except where the plug is partially cut away for flow control, valve plug axles extending longitudinally along the axis of rotation, main bearings for said axles, a thrust bearing seated at one end of the valve plug, said valve plug having a liquid access hole running from the valve chamber to the main bearing behind the thrust bearing as a lubricating means, main bearing support means with a weep hole at the extreme end of the main bearing, sealing means mounted to confine liquid exuding from the valve to the weep holes, and a thrust means to keep the thrust bearing in compression, each main bearing and axle being so constructed and mounted as to prevent significant lateral movement of the plug thereby to maintain said clearances at all times.

5. A fluid diversion valve comprising a valve body having inlet and outlet ports, a cylindrical valve chamber, and a support ledge extending partially across one end of the valve chamber, a cylindrical valve plug rotatably mounted in said valve chamber with clearances sufficient to maintain free passage of suspended particles and partially cut away leaving essentially two parallel disks with a segment of a cylinder extending between them, a stub axle at one end of said valve plug on its axis of rotation and a longer control axle at the opposite end, main bearings for said axles, main bearing seals seated on the valve plug around the axles, a floating seal, a bearing cap fitting over the long axle and fitting one of said main bearings to the support ledge, a floating-bearing-support means comprising a piston which carries said other main bearing internally, a piston plug to contain said other main bearing within said piston, means carried by the piston for limiting the independent axial movement toward the plug of the bearing carried therein, said main bearing seals being located between the piston and plug and between the ledge and plug respectively, a spring, and a retainer cap which supports said spring and positions it against said piston plug thereby compressing the main bearing seals on the valve plug between said floating-bearing-support means and said support ledge respectively, said floating seal being externally seated around said piston and compressed against said valve chamber.

6. A fluid flow-control valve adapted for long life comprising a valve body having inlet and outlet ports and defining a valve chamber, a valve plug mounted in said valve chamber and shaped generally to conform to the valve chamber sufficient to cover all ports except for a recess to form a flow passage adapted to be aligned between preselected ports, at least one shaft fixed to said valve plug, at least one main bearing mounted to the valve body for each shaft, seal means for at least substantially isolating each main bearing from any particulate suspension flowing through said valve, and all other clearances in said valve chamber being sufficient to maintain free passage of the particles of said suspension therethrough, each main bearing and shaft being so constructed and mounted as to prevent lateral movement of the plug thereby to maintain said other clearances at all times.

7. A fluid flow-control valve adapted for long life comprising a valve body having an inlet and outlet ports and defining a valve chamber the interior of which conforms to a surface of revolution, a valve plug rotatably mounted in said valve chamber with clearances sufficient to maintain free passage of suspended particles and said plug having a shape generally conforming to that of the valve chamber except that it is recessed to form a flow passage between preselected ports, said valve plug being provided with at least one axle extending longitudinally along the axis of rotation, at least one main bearing mounted to the valve body for each axle, seal means including a thrust bearing mounted between the valve chamber and each main bearing, and thrust means for compressing each thrust bearing between the valve plug and the valve body, each main bearing and axle being so constructed and mounted as to prevent lateral movement of the plug thereby to maintain said clearances at all times.

8. A valve as claimed in claim 7 wherein the valve body has a cap portion into which the valve chamber extends beyond one end of the plug and with its walls parallel to the axis of the plug, a floating-main-bearing-support means mounted in said cap portion slidably axially therein, and a thrust means below said floating-main-bearing-support means for exerting pressure thereon to hold it in supporting position on the plug and to press the plug into sealing relation against at least one thrust bearing.

9. A valve as claimed in claim 7 wherein said thrust bearing is composed of an abrasion-resistant material having good sealing and bearing characteristics.

References Cited by the Examiner

UNITED STATES PATENTS

| | | | |
|---|---|---|---|
| 1,383,400 | 7/1921 | Hartel | 137—625.47 |
| 1,493,133 | 5/1924 | Sykora | 251—209 X |
| 1,705,281 | 3/1929 | Bott | 308—189 |
| 2,307,443 | 1/1943 | Atkinson | 251—309 |
| 2,313,090 | 3/1943 | Reiser | 251—182 X |
| 2,559,695 | 7/1951 | Allen | 251—309 |
| 2,718,665 | 9/1955 | Clade | 251—309 X |
| 2,774,363 | 12/1956 | Benzien | 137—1 |
| 2,820,470 | 1/1958 | Sanders | 251—312 X |
| 2,997,057 | 8/1961 | Toth | 251—317 X |
| 3,014,489 | 12/1961 | Lamp | 137—1 |
| 3,126,916 | 3/1964 | Ducey | 137—246.12 X |

M. CARY NELSON, *Primary Examiner.*

ISADOR WEIL, *Examiner.*